(12) United States Patent
Isoda et al.

(10) Patent No.: US 11,884,220 B2
(45) Date of Patent: Jan. 30, 2024

(54) PROTECTOR FOR WIRE HARNESS AND WIRE HARNESS APPARATUS

(71) Applicant: SUMITOMO WIRING SYSTEMS, LTD., Mie (JP)

(72) Inventors: Kazuma Isoda, Mie (JP); Hiroki Uno, Mie (JP); Hiroshi Inoue, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 195 days.

(21) Appl. No.: 17/434,131

(22) PCT Filed: Dec. 17, 2019

(86) PCT No.: PCT/JP2019/049441
§ 371 (c)(1),
(2) Date: Aug. 26, 2021

(87) PCT Pub. No.: WO2020/174831
PCT Pub. Date: Sep. 3, 2020

(65) Prior Publication Data
US 2022/0144190 A1  May 12, 2022

(30) Foreign Application Priority Data
Feb. 28, 2019  (JP) .................................. 2019-036678

(51) Int. Cl.
*B60R 16/02* (2006.01)
*H02G 11/00* (2006.01)
*H02G 3/04* (2006.01)

(52) U.S. Cl.
CPC ....... *B60R 16/0215* (2013.01); *H02G 3/0475* (2013.01); *H02G 11/00* (2013.01)

(58) Field of Classification Search
CPC .... H02G 11/00; H02G 3/0475; H02G 3/0418; H02G 3/0437; F16G 13/16
See application file for complete search history.

(56) References Cited

U.S. PATENT DOCUMENTS 4,953,735 A * 9/1990 Tisbo ................... H02G 3/0437
220/837
6,107,576 A * 8/2000 Morton ................ H02G 3/0418
174/101

(Continued)

FOREIGN PATENT DOCUMENTS

JP   H02-014216 U   1/1990
JP   2003-319543 A   11/2003

(Continued)

OTHER PUBLICATIONS

International Search Report dated Mar. 17, 2020 for WO 2020/174831 A1 (4 pages).

*Primary Examiner* — Paresh Paghadal
(74) *Attorney, Agent, or Firm* — Venjuris, P.C.

(57) ABSTRACT

Provided is a wire harness apparatus 80 that uses a protector 10 for a wire harness that includes a body portion 16 into which a wire harness W is to be inserted; a cover body 18 that covers an opening portion 56 of the body portion 16; a joining portion 20 with flexibility that is formed thinner than the body portion 16 and the cover body 18 and rotatably joins the cover body 18 to a first side wall 22a of the body portion 16; a body contact portion 40 provided on the first side wall 22a of the body portion 16; and a cover body contact portion 58 provided on the cover body 18 that transfers a load applied to the cover body 18 to the body portion 16 by the cover body contact portion 58 coming into contact with the body contact portion 40.

7 Claims, 6 Drawing Sheets

(56) References Cited

U.S. PATENT DOCUMENTS

| | | | |
|---|---|---|---|
| 6,284,974 B1 * | 9/2001 | Albert .................. | H02G 3/0418 |
| | | | 52/287.1 |
| 6,318,063 B1 | 11/2001 | Komiya et al. | |
| 6,333,461 B1 | 12/2001 | Marcou et al. | |
| 6,550,232 B1 * | 4/2003 | Achs .................... | H02G 11/006 |
| | | | 59/78.1 |
| 6,903,265 B1 * | 6/2005 | VanderVelde ........ | H02G 3/0418 |
| | | | 174/68.3 |
| 8,183,460 B2 * | 5/2012 | Williams ............. | H02G 3/0431 |
| | | | 174/72 A |

FOREIGN PATENT DOCUMENTS

| | | |
|---|---|---|
| JP | 2010-179685 A | 8/2010 |
| JP | 2018-042394 A | 3/2018 |

* cited by examiner

PROTECTOR FOR WIRE HARNESS AND WIRE HARNESS APPARATUS

CROSS REFERENCE TO RELATED APPLICATIONS

This application is a national phase of PCT application No. PCT/JP2019/049441, filed on 17 Dec. 2019, which claims priority from Japanese patent application No. 2019-036678, filed on 28 Feb. 2019, all of which are incorporated herein by reference.

TECHNICAL FIELD

The present disclosure relates to a protector for a wire harness that houses and holds a wire harness of a vehicle and a wire harness apparatus.

BACKGROUND

In Patent Document 1, a protector for a wire harness is disclosed that includes a body portion into which a wire harness is inserted and a cover body that covers an opening portion of the body portion. The cover body is joined to the body portion via a flexible joining portion that is thinner than the cover body and the body portion. The joining portion functions as a hinge that allows the cover body to rotate relative to the body portion.

In Patent Document 2, a protector for a wire harness is described that is constituted by a cable guide that covers a wire harness that extends between a vehicle body and a movable body such as a slide door. The cable guide is formed by joining together a plurality of cylindrical link frame bodies in a manner allowing for rotation. An insertion path through which the wire harness is inserted is formed by the internal space of the continuous link frame bodies.

In the cable guide disclosed in Patent Document 3, link frame bodies each include a body portion into which a wire harness is inserted and a cover body that covers an opening portion of the body portion. The cover body of each link frame body is joined to the body portion via a flexible joining portion that is thinner than the cover body and the body portion.

PRIOR ART DOCUMENT

Patent Document

Patent Document 1: JP 2018-042394 A
Patent Document 2: JP 2010-179685 A
Patent Document 3: JP 2001-116088 A

SUMMARY OF THE INVENTION

Problems to be Solved

However, these protectors for a wire harness have a structure in which, when a load is applied to the cover body, the load is directly transferred to the joining portion due to the cover body and the body portion being joined via the joining portion. Furthermore, to give the joining portion the desired flexibility, the joining portion is made thinner than the cover body and the body portion. This reduces the load resistance of the joining portion, making an improvement in the durability of the joining portion desirable.

In regards to this, the present disclosure is directed at providing a protector for a wire harness in which a joining portion that joins together a cover body and a body portion has enhanced durability and a wire harness apparatus using the protector for a wire harness.

Means to Solve the Problem

A protector for a wire harness of the present disclosure is a protector for a wire harness including:
a body portion into which a wire harness is to be inserted;
a cover body that covers an opening portion of the body portion;
a joining portion with flexibility that is formed thinner than the body portion and the cover body and rotatably joins the cover body to a first side wall of the body portion;
a body contact portion provided on the first side wall of the body portion; and
a cover body contact portion provided on the cover body that transfers a load applied to the cover body to the body portion by the cover body contact portion coming into contact with the body contact portion.

A wire harness apparatus of the present disclosure is a wire harness apparatus including:
the protector for a wire harness described above a wire harness housed in the protector for a wire harness.

Effect of the Invention

According to the present disclosure, provided are a protector for a wire harness in which a joining portion that joins together a cover body and a body portion has enhanced durability and a wire harness apparatus using the protector for a wire harness.

DETAILED DESCRIPTION TO EXECUTE THE INVENTION

Description of Embodiments

Figure 1:
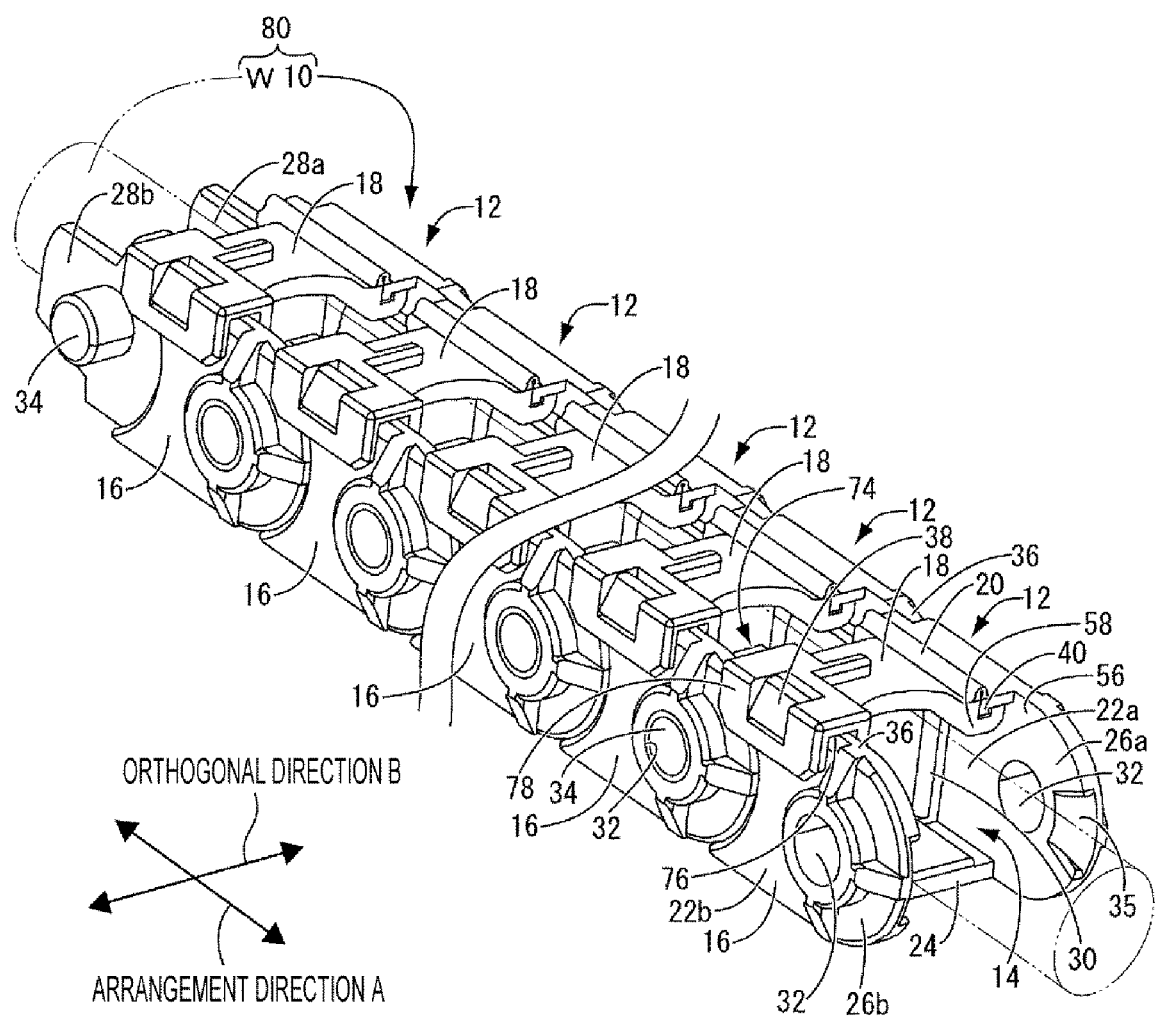
FIG. 1 is a perspective view for describing a representative example configuration of a protector for a wire harness according to the first embodiment.

Firstly, embodiments of the present disclosure will be listed and described.

(1) A protector for a wire harness according to the present disclosure is a protector for a wire harness that includes: a body portion into which a wire harness is to be inserted; a cover body that covers an opening portion of the body portion; a joining portion with flexibility that is formed thinner than the body portion and the cover body and rotatably joins the cover body to a first side wall of the body portion; a body contact portion provided on the first side wall of the body portion; and a cover body contact portion provided on the cover body that transfers a load applied to the cover body to the body portion by the cover body contact portion coming into contact with the body contact portion.

According to the protector for a wire harness of the present disclosure, the body contact portion is provided on the first side wall of the body portion to which the cover body is joined via the joining portion. The cover body is provided with the cover body contact portion that transfers to the body portion a load applied to the cover body via the cover body contact portion coming into contact with the body contact portion. Thus, even in a case where a load is applied to the cover body and the cover body is moved in position relative to the body portion, the cover body contact portion comes into contact with the body contact portion, dispersing the load to the body portion. As a result, the load being directly transferred to the joining portion can be avoided, and the likelihood of the joining portion, which is thinner and more fragile than the body portion and the cover body, being damaged by the load can be decreased. In this manner, the user-friendliness brought about by the structure in which the body portion and the cover body are integrally joined by the joining portion can be maintained and improvements to the durability of the joining portion and the protector for a wire harness can both be achieved in a compatible manner.

Note that the body contact portion and the cover body contact portion may be in contact with one another in the default state with no load applied to the cover body. Also, in the default state, a gap may be formed between the opposing surfaces of the body contact portion and the cover body contact portion, and, when a load is applied to the cover body, the body contact portion and the cover body contact portion may move toward one another and come into contact.

(2) In the protector for a wire harness, preferably the body portion includes a bottom wall, the first side wall provided extending up from one of two side edges of the bottom wall, and a second side wall provided extending up from another one of the two side edges of the bottom wall, the bottom wall, the first side wall, and the second side wall defining an insertion path through which the wire harness is to be inserted; the body contact portion includes a sideward projecting portion that projects from a projecting leading end portion of the first side wall toward the second side wall; the body contact portion is constituted by the sideward projecting portion; and a first end portion of the cover body is joined to an upper surface of the sideward projecting portion by the joining portion.

The insertion path through which the wire harness is to be inserted is defined by the bottom wall constituting the body portion and the first side wall and the second side wall, which are a pair of side walls provided extending up from the side edges of the bottom wall. Furthermore, the body contact portion is constituted by the sideward projecting portion that projects from the projecting leading end portion of the first side wall of the body portion toward the second side wall. In this manner, when the wire harness with a circular cross-section is housed in the insertion path, the dead space region can be used to dispose the body contact portion. In a similar manner, the cover body contact portion that comes into contact with the body contact portion can be disposed using this dead space region. As a result, the body contact portion and the cover body contact portion may be provided in a space-efficient manner.

Furthermore, the first end portion of the cover body is joined, via the joining portion, to the upper surface of the sideward projecting portion that projects from the projecting leading end portion of the first side wall toward the second side wall. Accordingly, when the cover body is rotated about the joining portion and opened, the path of the cover body projecting from the body portion can be reduced, and the space required to install the protector for a wire harness can be reduced. Note that the second end portion of the cover body is preferably attached, via a lock mechanism, to the leading end portion of the second side wall of the body portion in a manner allowing it to be freely opened and closed.

(3) In the protector for a wire harness according (2), preferably the cover body contact portion includes a downward projecting portion that projects from a lower surface of the cover body toward the bottom wall of the body portion when the cover body is in a closed state and a sideward projecting portion that projects from a projecting end portion of the downward projecting portion toward the first side wall when the cover body is in a closed state; by disposing the sideward projecting portion of the cover body beneath the sideward projecting portion of the body portion, the sideward projecting portion of the cover body and the sideward projecting portion of the body portion come into contact with one another in an opposite direction to an opposing direction in which the cover body and the bottom wall of the body portion oppose one another; and the downward projecting portion of the cover body and the sideward projecting portion of the body portion come into contact with one another in an orthogonal direction orthogonal to the opposing direction.

The sideward projecting portion constituting the cover body contact portion and the sideward projecting portion constituting the body contact portion come into contact with one another in the opposite direction to the opposing direction in which the cover body and the bottom wall of the body portion oppose one another. Accordingly, when the wire harness inserted in the body portion comes into contact with the cover body and a load is applied in the opposite direction to the opposing direction in which the cover body and the bottom wall of the body portion oppose one another, the sideward projecting portion and the sideward projecting portion come into contact, reliably dispersing the load applied to the cover body. In this manner, the load is prevented from directly affecting the fragile joining portion. Specifically, the first end portion of the cover body is joined to the upper surface of the sideward projecting portion by the joining portion. Thus, a load applied to the cover body in the opposite direction to the opposing direction in which the cover body and the bottom wall of the body portion oppose one another can be dispersed to the body portion by the sideward projecting portion and the sideward projecting portion coming into contact before the load is transferred to the joining portion.

Furthermore, the downward projecting portion of the cover body and the sideward projecting portion of the body portion come into contact with one another in the orthogonal direction orthogonal to the opposing direction in which the cover body and the bottom wall of the body portion oppose one another. Accordingly, when a load is applied to the second side wall side of the body portion, the load applied to the cover body by the downward projecting portion and the sideward projecting portion coming into contact with one another can be dispersed to the first side wall, preventing the load directly affecting the fragile joining portion.

(4) In the protector for a wire harness according to (3), preferably a recess that opens toward the bottom wall is formed on a base end side of the sideward projecting portion of the body portion; the cover body further includes an upward projecting portion that projects upward from a projecting end portion of the sideward projecting portion; the upward projecting portion of the cover body is disposed housed in the recess of the body portion; and an outer surface of the upward projecting portion and an inner surface of the recess come into contact with one another at both sides in the orthogonal direction and the opposite direction to the opposing direction.

The recess is provided in the base end side of the sideward projecting portion of the body portion, the upward projecting portion is provided on the projecting end portion of the sideward projecting portion of the cover body, and the upward projecting portion is disposed housed in the recess. Accordingly, the dead space in the insertion path of the body portion can be used, and the cover body contact portion and the body contact portion can be brought into contact with one another in the opposing direction of the cover body and the bottom wall of the body portion and the direction orthogonal thereto. Specifically, the outer surface of the upward projecting portion and the inner surface of the recess come into contact with one another at both sides in the direction orthogonal to the opposing direction in which the cover body and the bottom wall of the body portion oppose one another. Accordingly, a load in a twisting direction applied to the cover body can also be dispersed to the body portion.

(5) The cover body contact portion preferably includes a cover body first contact surface that runs parallel with the cover body; and the body contact portion preferably includes a body first contact surface that runs parallel with a bottom surface of the cover body and comes into contact with the cover body first contact surface. Accordingly, in a case where a load is applied to the cover body due to the wire harness inserted in the body portion coming into contact with the cover body or the like, the cover body first contact surface and the body first contact surface can come into direct contact with one another. As a result, the load applied to the cover body can be reliably and stably dispersed to the body portion.

(6) The cover body contact portion preferably includes a cover body second contact surface that runs orthogonal to the cover body; and the body contact portion preferably includes a body second contact surface that runs orthogonal to a bottom surface of the cover body. Accordingly, in a case where a load is applied from the side wall side of the body portion, the cover body first contact surface and the cover body second contact surface and the body second contact surface can come into direct contact with one another. As a result, the load applied to the cover body can be reliably and stably dispersed to the body portion.

(7) The protector for a wire harness preferably includes a cable guide including a plurality of link frame bodies with a cylindrical shape disposed in a row and joined to one another in a manner allowing for rotation, wherein the plurality of link frame bodies each include the body portion and the cover body and the plurality of link frame bodies formed in the cylindrical shape each further include the joining portion, the body contact portion, and the cover body contact portion.

The link frame bodies constituting the cable guide each include the body portion and the cover body and are formed in a cylindrical shape. Also, the cover body is joined to the body portion via the joining portion. Accordingly, with the cable guide having a long length of joined link frame bodies, the opening portions of the body portions can be opened by opening the cover bodies of the link frame bodies. As a result, compared to a case where the wire harness is inserted from a first end side in the longitudinal direction of the cable guide, the wire harness can be easily housed in the body portion of each of the link frame bodies via the opening portion. Furthermore, the body portion is provided with the body contact portion, and the cover body is provided with the cover body contact portion. Thus, in a case where a load is applied to the cover body and the cover body is moved in position relative to the body portion, the cover body contact portion comes into contact with the body contact portion, dispersing the load to the body portion. As a result, the load being directly transferred to the joining portion can be avoided, the durability of the joining portion which is thinner and more fragile than the body portion and the cover body can be improved, and the likelihood of the joining portion being damaged by the load can be decreased.

A wire harness apparatus of the present disclosure is (8) a wire harness apparatus including: the protector for a wire harness according to any one of (1) to (7); and a wire harness housed in the protector for a wire harness.

According to the wire harness apparatus of the present disclosure, the wire harness apparatus in which a wire harness is housed in a protector for a wire harness can obtain the same effects obtained by the protector for a wire harness disclosed in any one of (1) to (7).

DESCRIPTION OF EMBODIMENTS

A specific example of a protector for a wire harness according to the present disclosure will be described below with reference to the drawings. Note that the present disclosure is not limited to these examples and is defined by the scope of the claims, and all modifications that are equivalent to or within the scope of the claims are included.

First Embodiment

Figure 2:
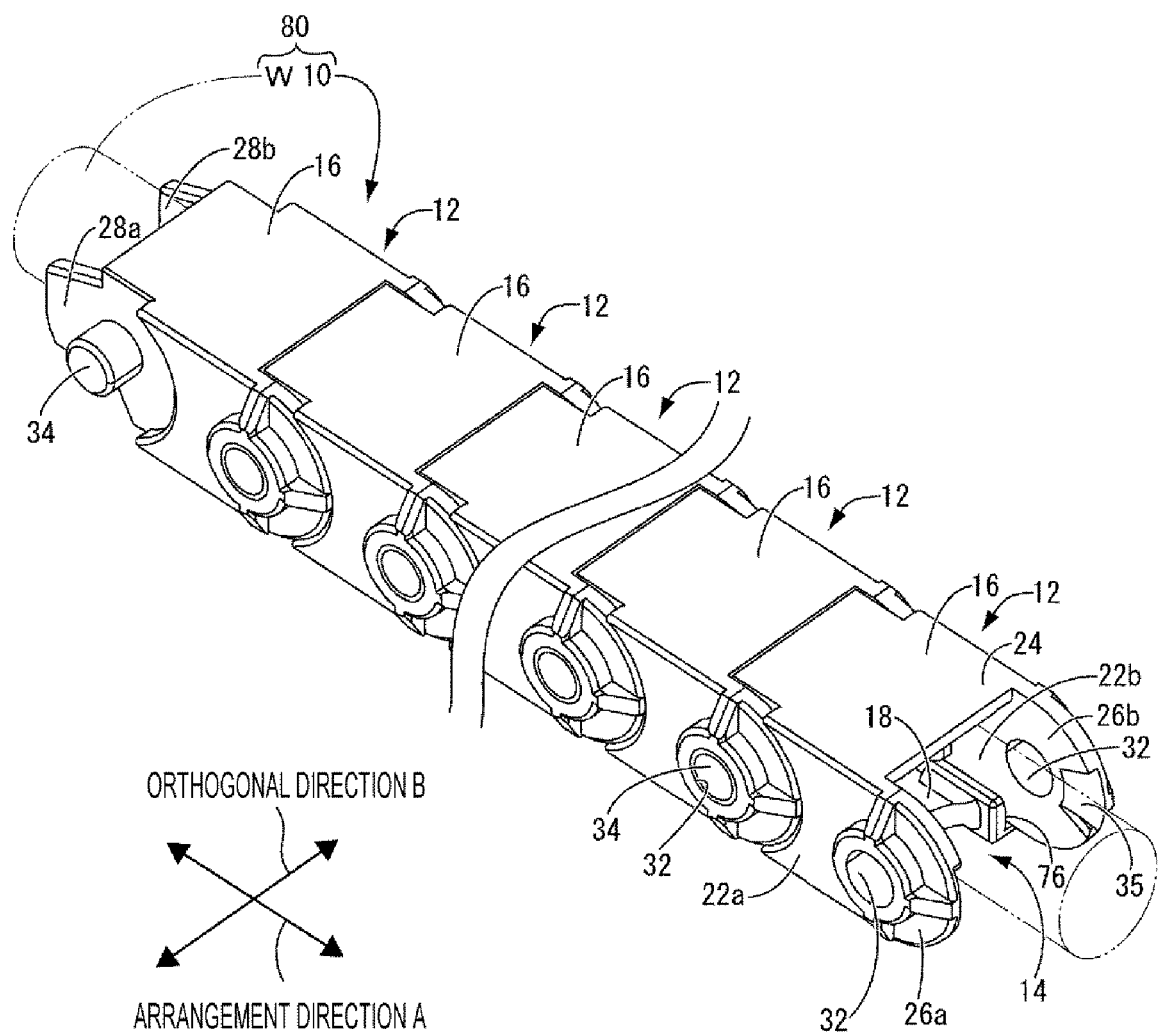
FIG. 2 is a perspective view of the protector for a wire harness illustrated in FIG. 1 as seen from a body portion side.

FIGS. 1 and 2 are diagrams illustrating a cable guide 10 that constitutes a protector for a wire harness according to an embodiment of the present disclosure. The cable guide 10 includes a plurality of cylindrical link frame bodies 12 disposed arranged in a row that are joined together in a manner allowing for rotation. The cable guide 10 extends a predetermined length in an arrangement direction A of the plurality of link frame bodies 12. Also, the cable guide 10 is used as an outer sheath for a wire harness W that extends between a non-illustrated vehicle body and a movable body, such as a slide door or the like. Inside each of the link frame bodies 12, an insertion path 14 is used to house the wire harness W described below. Note that to facilitate understanding, in FIGS. 1, 2, and 7, the wire harness W is indicated with an imaginary line. The wire harness W may be a single wire or include a plurality of wires. The wire harness W is typically a single bundle of a plurality of wires.

Figure 3:
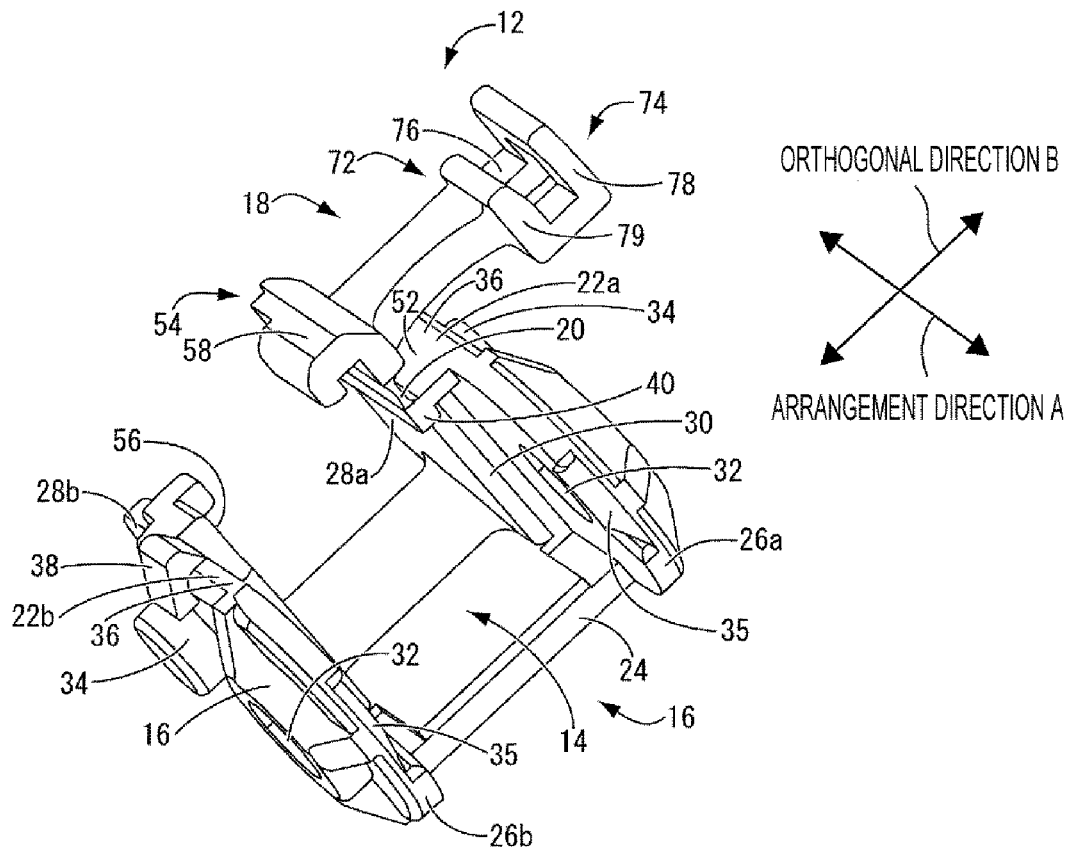
FIG. 3 is an enlarged perspective view illustrating a link frame body illustrated in FIG. 1 in an open state.
Figure 4:
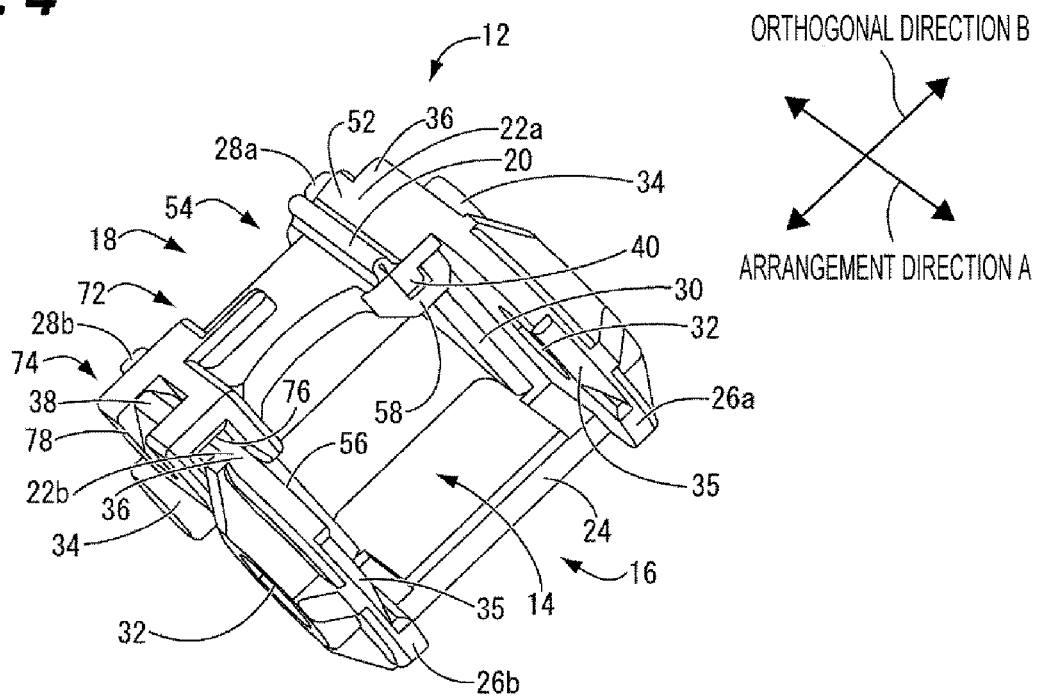
FIG. 4 is an enlarged perspective view illustrating a link frame body illustrated in FIG. 3 in a closed state.

As illustrated in FIGS. 3 and 4, the link frame body 12 includes a body portion 16 and a cover body 18 and is formed in a cylindrical shape. The link frame body 12 includes a joining portion 20 for joining the cover body 18 to the body portion 16 in a manner allowing for rotation. The link frame body 12 is a one-piece component that is integrally formed by injection molding or the like using a synthetic resin, such as polypropylene, polyamide, or the like.

Figure 5:
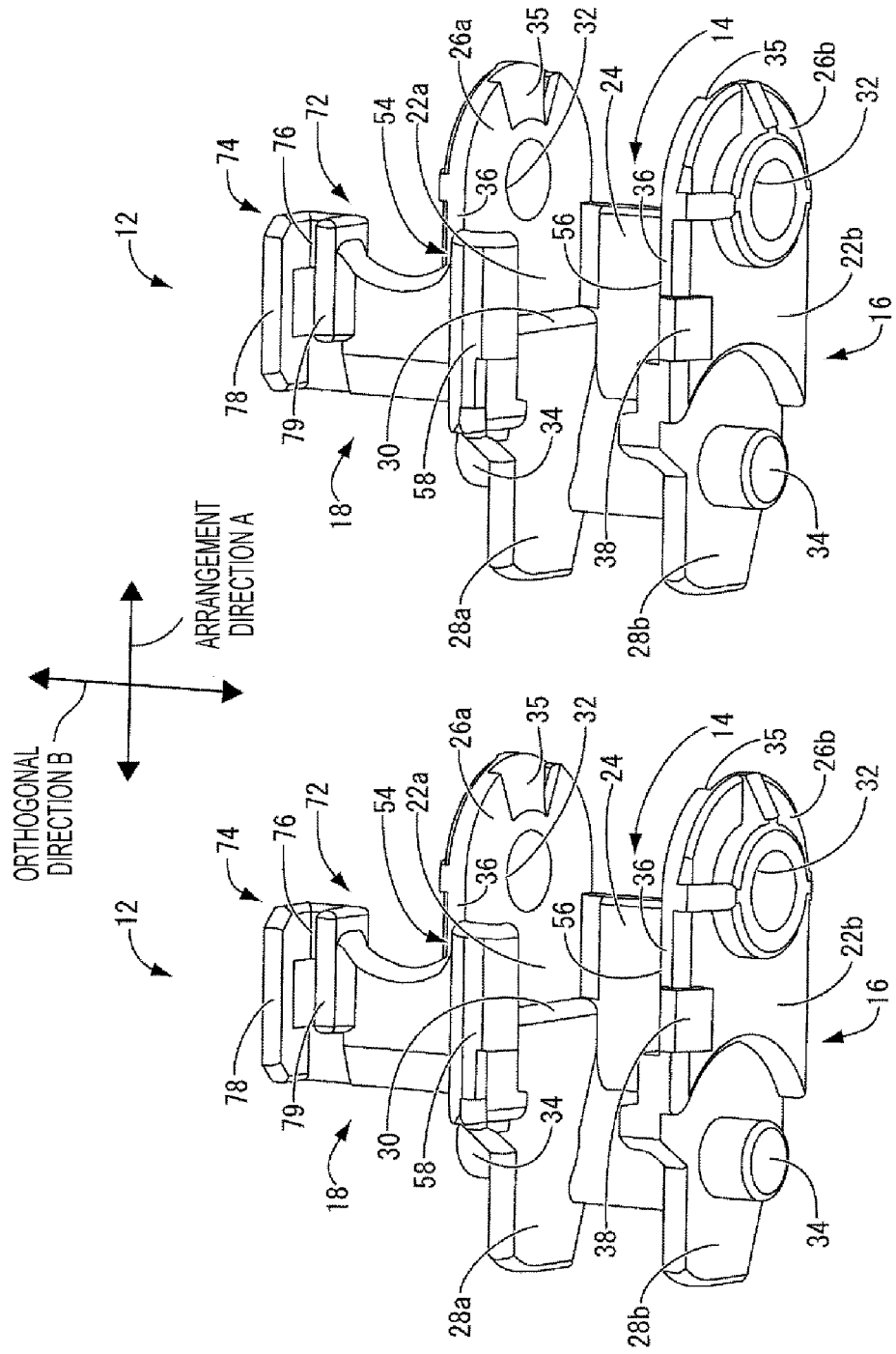
FIG. 5 is a perspective view illustrating link frame bodies in a state just prior to being joined together.
Figure 6:
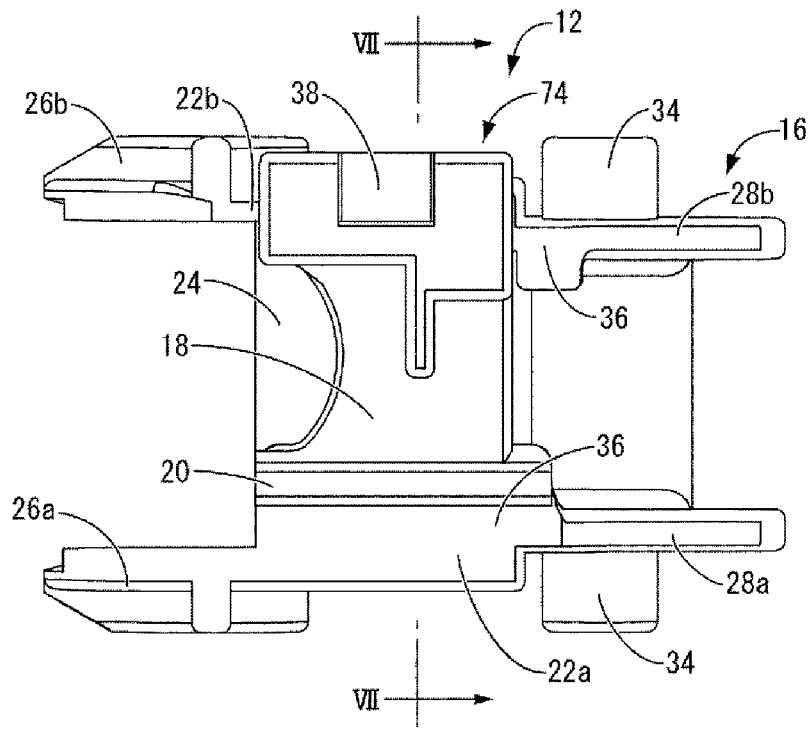
FIG. 6 is a side view illustrating the link frame body illustrated in FIG. 4.

As illustrated in FIGS. 3 to 5, the body portion 16 is formed overall in a groove-like shape and includes a first side wall 22a and a second side wall 22b disposed opposite one another in an orthogonal direction B orthogonal to the arrangement direction A and a bottom wall 24 that connects the base end portions of the first side wall 22a and the second side wall 22b. The first side wall 22a, the second side wall 22b, and the bottom wall 24 are integrally formed. In other words, the first side wall 22a is provided extending up from one side edge of the bottom wall 24, and the second side wall 22b is provided extending up from the other side edge of the bottom wall 24. Also, the bottom wall 24, the first side wall 22a, and the second side wall 22b define the insertion path 14 through which the wire harness W is inserted.

The first side wall 22a includes a first plate 26a disposed on one side in the arrangement direction A of the plurality of link frame bodies 12 and a second plate 28a disposed on the other side in the arrangement direction A. Also, the second side wall 22b includes a first plate 26b disposed on one side in the arrangement direction A of the plurality of link frame bodies 12 and a second plate 28b disposed on the other side in the arrangement direction A. In the first side wall 22a and the second side wall 22b, the first plates 26a, 26b and the second plates 28a, 28b are integrally connected, but are offset from one another in the orthogonal direction B, i.e., the thickness direction. The first side wall 22a including the first plate 26a and the second plate 28a and the second side wall 22b including the first plate 26b and the second plate 28b have an offset structure in which a step portion 30 is formed at the portion where the first plates 26a, 26b and the second plates 28a, 28b are connected.

In the first side wall 22a and the second side wall 22b, the first plate 26a, 26b is located further out in the orthogonal direction B than the second plate 28a, 28b. The inner surface of the first plate 26a, 26b extend along the same plane as the outer surface of the second plate 28a, 28b.

A joining pin hole 32 is formed in the first plate 26a, 26b that extends through the first plate 26a, 26b in the orthogonal direction B. The first plate 26a, 26b is thick at the portion around the opening of the joining pin hole 32, ensuring rigidity to resist deformation at the opening portion of the joining pin hole 32. The joining pin hole 32 is not limited to a through-hole and may be a recess with a closed outer opening, for example. A joining pin 34 that projects outward in the orthogonal direction B is formed in the second plate 28a, 28b. The inner circumferential surface of the joining pin hole 32 and the outer circumferential surface of the joining pin 34 have a corresponding circular cross-sectional shape.

A fan-shaped guide groove 35 is formed in the inner surface of the leading end portion of the first plate 26a, 26b on the side away from the second plate 28a, 28b in the arrangement direction A of the first plate 26a, 26b. The depth of the guide groove 35 increases toward the leading end of a projecting leading end portion 36.

A locking catch 38 is integrally formed on the projecting leading end portion 36 of the second side wall 22b. The locking catch 38 project outward in the orthogonal direction B. The locking catch 38 is formed with an inclined surface that inclines outward in the orthogonal direction B as it extends toward the base end portion side. The surface of the locking catch 38 on the base end portion side is formed as a flat engagement surface.

The first side wall 22a and the second side wall 22b are joined together at the base end portion by the plate-like bottom wall 24. The bottom wall 24 is integrally formed with the first side wall 22a and the second side wall 22b.

Figure 7:
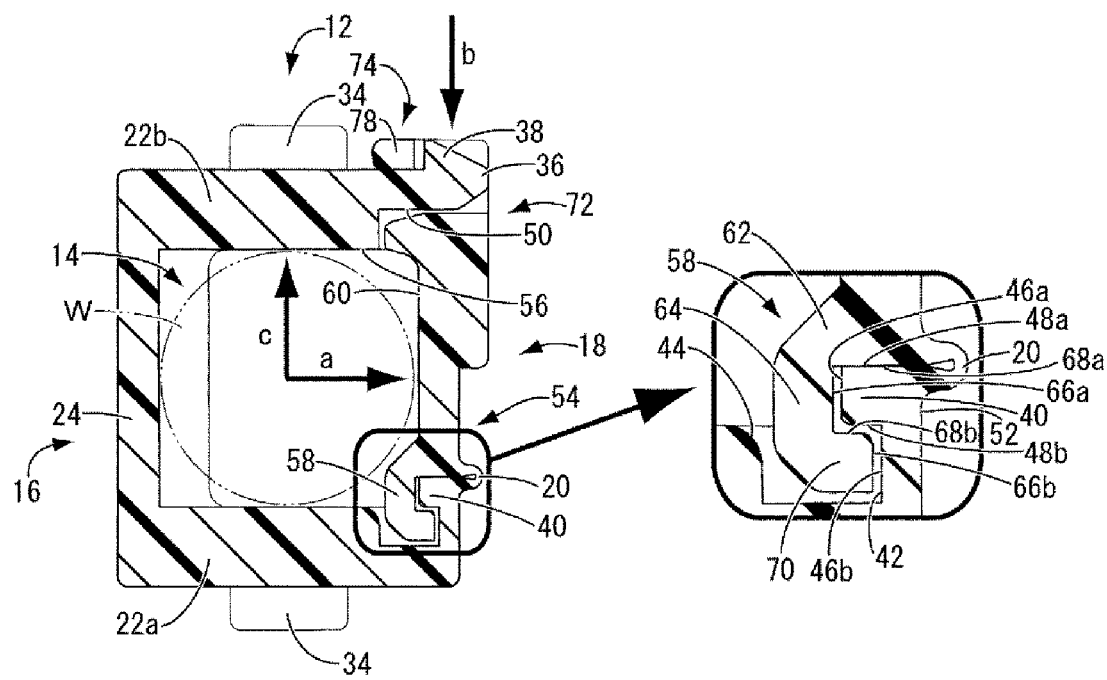
FIG. 7 is a cross-sectional view taken along VII-VII of FIG. 6.

The projecting leading end portion 36 of the first side wall 22a is provided with a sideward projecting portion 40 with a rectangular cross-sectional shape that projects toward the second side wall 22b. The sideward projecting portion 40 functions as a body contact portion that comes into contact with a cover body contact portion 58 described below. As illustrated in FIG. 7, the sideward projecting portion 40 (the body contact portion) is provided on the body portion 16 using the dead space where the wire harness W with a circular cross-section is not located when housed in the insertion path 14. Also, the base end portion side (the lower side in FIG. 7) of the sideward projecting portion 40 is formed thinner than the projecting end portion (on the upper side in FIG. 7). In this manner, a recess 42 is formed on the base end portion side of the sideward projecting portion 40 that has a rectangular cross-sectional shape that opens toward the bottom wall 24 side. Note that, in the first side wall 22a, a recess 44 that opens toward the second side wall 22b is provided on the base end side of the second plate 28a offset more to the insertion path 14 side than the first plate 26a. The recess 44 is formed continuous with the recess 42 (see FIG. 7). The recess 44 on the bottom wall 24 side of the recess 42 is provided with a rounded edge. This helps to advantageously prevent the cover body contact portion 58 of the cover body 18 described below from coming into contact with the recess 44 and being worn down.

The sideward projecting portion 40 with such a structure includes body first contact surfaces 46a, 46b that run parallel (the vertical direction in FIG. 7) with the bottom surface of the cover body 18 and body second contact surfaces 48a, 48b that run orthogonal (the lateral direction in FIG. 7) to the bottom surface of the cover body 18.

The projecting leading end portion 36 of the inner surface of the second side wall 22b of the body portion 16 is formed thin by a cutout portion 50 cut out from the second side wall 22b side being provided. Both of the corner portions in the plate thickness direction (the vertical direction in FIG. 7) of the projecting leading end portion 36 of the second side wall 22b are chamfered.

As illustrated in FIGS. 3, 4, and 7, a first end portion 54 of the cover body 18 is joined to an upper surface 52 of the sideward projecting portion 40 of the body portion 16 via the joining portion 20. The joining portion 20 is formed thinner than the body portion 16 and the cover body 18 and has flexibility allowing it to rotatably join the cover body 18 to the first side wall 22a constituting the body portion 16. The first end portion 54 of the cover body 18 is joined to the upper surface 52 of the sideward projecting portion 40 that projects from the first side wall 22a toward the insertion path 14. Thus, in a case where the cover body 18 is opened by being rotated about the joining portion 20, the path of the cover body 18 projecting from the body portion 16 can be reduced. In this manner, the space required to install the cable guide 10 can be reduced.

As illustrated in FIGS. 3 and 4, the cover body 18 has a rectangular plate-like shape that allows it to cover an opening portion 56 of the body portion 16. As illustrated in FIGS. 3, 4, and 7, the cover body 18 is provided with the cover body contact portion 58. The cover body contact portion 58 includes a downward projecting portion 62 that projects from a lower surface 60 at the first end portion 54 of the cover body 18 toward the bottom wall 24 of the body portion 16, when the cover body 18 is in a closed state, and a sideward projecting portion 64 that projects from the projecting end portion of the downward projecting portion 62 toward the first side wall 22*a* (see FIG. 7). The cover body 18 further includes an upward projecting portion 70 that projects upward from the projecting end portion of the sideward projecting portion 64. In this manner, the cover body contact portion 58 can be provided in a highly space-efficient manner using the dead space where the wire harness W with a circular cross-section is not located when housed in the insertion path 14.

As illustrated in FIG. 7, when the cover body 18 is in a closed state, the cover body contact portion 58 is disposed close to the sideward projecting portion 40, i.e., the body contact portion, via the recess 44 and the recess 42. The sideward projecting portion 64 of the cover body 18 is disposed down (to the left in FIG. 7) of the sideward projecting portion 40 of the body portion 16. The sideward projecting portion 64 includes a cover body first contact surface 66*a* that runs parallel with the cover body 18. Accordingly, in the opposite direction to the direction the cover body 18 and the bottom wall 24 of the body portion 16 oppose one another, the cover body first contact surface 66*a* of the sideward projecting portion 64 of the cover body 18 and the body first contact surface 46*a* of the sideward projecting portion 40 of the body portion 16 come into contact with one another. The downward projecting portion 62 of the cover body contact portion 58 includes a cover body second contact surface 68*a* that runs orthogonal to the cover body 18. In the orthogonal direction orthogonal to the direction the cover body 18 and the bottom wall 24 of the body portion 16 oppose one another, the cover body second contact surface 68*a* of the downward projecting portion 62 of the cover body 18 and the body second contact surface 48*a* of the sideward projecting portion 40 of the body portion 16 come into contact with one another.

The upward projecting portion 70 of the cover body contact portion 58 is disposed housed in the recess 42 of the body portion 16 when the cover body 18 is in a closed state. The upward projecting portion 70 of the cover body contact portion 58 includes a cover body second contact surface 68*b* that runs orthogonal to the cover body 18. In the orthogonal direction orthogonal to the direction the cover body 18 and the bottom wall 24 of the body portion 16 oppose one another, the cover body second contact surface 68*b* of the upward projecting portion 70 of the cover body 18 and the body second contact surface 48*b* of the sideward projecting portion 40 of the body portion 16 come into contact with one another. Also, the upward projecting portion 70 of the cover body contact portion 58 includes a cover body first contact surface 66*b* that runs parallel with the cover body 18. In the opposite direction to the direction the cover body 18 and the bottom wall 24 of the body portion 16 oppose one another, the cover body first contact surface 66*b* of the upward projecting portion 70 of the cover body 18 and the body first contact surface 46*b* of the sideward projecting portion 40 of the body portion 16 come into contact with one another. In this manner, the outer surface of the upward projecting portion 70 and the inner surface of the recess 42 come into contact with one another at both sides in the orthogonal and opposite directions to the direction the cover body 18 and the bottom wall 24 of the body portion 16 oppose one another.

As illustrated in FIG. 5, a lock frame portion 74 is formed on a second end portion 72 of the cover body 18. The lock frame portion 74 includes a U-shaped deflection piece 78 that engages with the locking catch 38. The lock frame portion 74 also includes an inner wall 79 that extends parallel with the deflection piece 78 and is disposed more inward in the orthogonal direction B than the deflection piece 78. The projecting leading end portion 36 of the second side wall 22*b* is housed in a housing recess 76 formed between the deflection piece 78 and the inner wall 79. When the cover body 18 is attached to the body portion 16, the deflection piece 78 elastically deforms, passes over the locking catch 38, and then the deflection piece 78 elastically returns in shape and engages with the locking catch 38 (snap-fit). In this manner, the cover body 18 is securely attached to the body portion 16.

Next, an assembly process for the cable guide 10 illustrated in FIG. 1 will be described with reference to FIG. 5. The cable guide 10 is configured by joining together the plurality of cylindrical link frame bodies 12 in a manner allowing for rotation within a predetermined angle range. As illustrated in FIG. 5, first, the joining pins 34 formed on the second plate 28*a*, 28*b* of the leading (located on the right in FIG. 5) link frame body 12 is fitted into the joining pin holes 32 formed in the first plates 26*a*, 26*b* of the following (located on the left in FIG. 5) link frame body 12. At this time, the projecting leading end portions 36 of the second plates 28*a*, 28*b* come into contact with the step portions 30 provided on the pair of side walls 22*a*, 22*b*, thus avoiding excessive insertion. Also, the projecting leading end portions 36 of the first plates 26*a*, 26*b* are provided with the guide grooves 35 formed with a depth that increased toward the leading end of the projecting leading end portion 36. In this manner, the joining pins 34 are guided by the guide grooves 35 and smoothly fit into the joining pin holes 32. Furthermore, the projecting leading end portions 36 of the second plates 28*a*, 28*b* provided with the joining pins 34 are formed with a smaller width than the base end portions. This allows the leading link frame body 12 to be rotatable about the joining pins 34 within a predetermined angle range with respect to the following link frame body 12, until the projecting leading end portions 36 come into contact with the inner surfaces of the first plates 26*a*, 26*b*.

The assembly of the cable guide 10 is completed by performing the assembly described above for the required amount of link frame bodies 12. The cable guide 10 assembled in this manner can be put in a state where, for each of the link frame bodies 12, the second end portion 72 of the cover body 18 is separated from the body portion 16 and the opening portion 56 of the body portion 16 is opened. In this state, the wire harness W is housed in the insertion path 14. In this manner, compared to a case where the wire harness W is inserted from a first end side in the longitudinal direction of the cable guide 10, the wire harness W can be easily housed in the body portion 16 of each of the link frame bodies 12 via the opening portion 56. Thereafter, the cover body 18 is rotated about the joining portion 20 to which the first end portion 54 of the cover body 18 is joined and the lock frame portion 74 of the cover body 18 is engaged with the locking catch 38 of the body portion 16 to cover the opening portion 56. At the first end portion 54 of the cover body 18, the upward projecting portion 70 of the cover body contact portion 58 is housed in the recess 42 of the body portion 16. Also, at the second end portion 72 of the cover body 18, the projecting leading end portion 36 of the second side wall 22*b* of the body portion 16 is housed in the housing recess 76 of the lock frame portion 74, and the deflection piece 78 of the lock frame portion 74 and the locking catch 38 of the body portion 16 are engaged. In this default state, according to the present embodiment, the cover body contact portion 58 and the body contact portion (the sideward projecting portion 40) are disposed opposite one another with a small gap inbetween. Note that in this default state, the cover body contact portion 58 and the body contact portion (the sideward projecting portion 40) may be in contact with one another.

As illustrated in FIG. 7, in the cable guide 10 covering the wire harness W in this manner, the cover body contact portion 58 provided on the cover body 18 comes into contact with the sideward projecting portion 40 constituting the body contact portion provided on the body portion 16. In a case where loads a, b, c (arrows a, b, c in FIG. 7) are applied to the cover body 18, the load applied to the cover body 18 is transferred to the body portion 16 and not the joining portion 20. The loads a, b, c illustrated in FIG. 7 act on the link frame body 12 (the cover body 18) in different directions, namely a first direction, a second direction, and a third direction. The load a acts on the cover body 18 from inside the link frame body 12 to open the cover body 18 and, thus, may be referred to as a lateral load. The load b acts on the body portion 16 from outside the link frame body 12 to reduce the opening portion 56 of the body portion 16 in the orthogonal direction B and compress the cover body 18 in the orthogonal direction B and, thus, may be referred to as a first vertical load. The load c acts on the body portion 16 from inside the link frame body 12 to expand the opening portion 56 of the body portion 16 in the orthogonal direction B and, thus, may be referred to as a second vertical load.

For example, when the cable guide 10 bends and deforms, the bent wire harness W comes into contact with the cover body 18, applying the load a to the cover body 18. As a result, the cover body 18 is moved in the direction of arrow a, and the cover body first contact surfaces 66a, 66b of the sideward projecting portion 64 of the cover body contact portion 58 of the cover body 18 comes into contact with the body first contact surfaces 46a, 46b of the sideward projecting portion 40 of the body portion 16. Accordingly, the load a applied to the cover body 18 is transferred to the body portion 16 and not the joining portion 20. When the cable guide 10 is extended between a vehicle and a slide door, for example, the cable guide 10 may be stepped on by a worker or the like, applying the load b to the cover body 18. Accordingly, the cover body 18 is moved toward the first side wall 22a of the body portion 16. As a result, the cover body second contact surface 68a of the downward projecting portion 62 of the cover body contact portion 58 of the cover body 18 comes into contact with the body second contact surface 48a of the sideward projecting portion 40 of the body portion 16. In addition, the outer surface of the upward projecting portion 70 comes into contact with the inner surface of the recess 42 and the recess 44. In this case also, the load b applied to the cover body 18 is transferred to the body portion 16 and not the joining portion 20. Furthermore, the load c may be applied to the cover body 18 when the wire harness W is bent, for example. Accordingly, the cover body 18 is moved toward the second side wall 22b of the body portion 16. As a result, the cover body second contact surface 68b of the upward projecting portion 70 of the cover body contact portion 58 of the cover body 18 comes into contact with the body second contact surface 48b of the sideward projecting portion 40 of the body portion 16. Accordingly, the load c applied to the cover body 18 is transferred to the body portion 16 and not the joining portion 20.

The effects of the cable guide 10 according to the present embodiment with such a structure include, in a case where a load is applied to the cover body 18 and the cover body 18 is moved in position relative to the body portion 16, the cover body contact portion 58 comes into contact with the sideward projecting portion 40, dispersing the load to the body portion 16. Specifically, in a case where the load a is applied to the cover body 18, the cover body first contact surfaces 66a, 66b of the cover body contact portion 58 comes into contact with the body first contact surfaces 46a, 46b of the sideward projecting portion 40. In addition, the outer surface of the upward projecting portion 70 comes into contact with the inner surface of the recess 42. Accordingly, the load a applied to the cover body 18 is dispersed to the body portion 16 and not the joining portion 20. Also, in a case where the load b is applied to the cover body 18, the cover body second contact surface 68a of the cover body contact portion 58 comes into contact with the body second contact surface 48a of the sideward projecting portion 40. In addition, the outer surface of the upward projecting portion 70 comes into contact with the inner surface of the recess 42. Accordingly, the load b applied to the cover body 18 is dispersed to the body portion 16 and not the joining portion 20. Furthermore, in a case where the load c is applied to the cover body 18, the cover body second contact surface 68b of the cover body contact portion 58 comes into contact with the body second contact surface 48b of the sideward projecting portion 40. Accordingly, the load c applied to the cover body 18 is dispersed to the body portion 16 and not the joining portion 20. In addition, the outer surface of the upward projecting portion 70 and the inner surface of the recess 42 come into contact with one another in both the directions orthogonal to the direction the cover body 18 and the bottom wall 24 of the body portion 16 oppose one another. Accordingly, a load in a twisting direction applied to the cover body 18 can also be dispersed to the body portion 16. As a result of the foregoing, the likelihood of a load-induced decrease in the load resistance of the joining portion 20, which is thinner and more fragile than the body portion 16 and the cover body 18, can be reduced. In this manner, the user-friendliness brought about by the structure in which the body portion 16 and the cover body 18 are integrally joined by the joining portion 20 can be maintained and improvements to the durability of the joining portion 20 and the cable guide 10 itself can both be achieved in a compatible manner.

Note that in a case where the cable guide 10 is used in a vehicle, the cable guide 10 may extend between a moving body such as a slide door and the vehicle in a manner such that the illustrated orthogonal direction B and the vertical direction of the cable guide 10 are aligned, but no such limitation is intended. The assembly of the cable guide 10 and the wire harness W housed in the cable guide 10 may be referred to as a wire harness apparatus 80.

Second Embodiment

Figure 8:
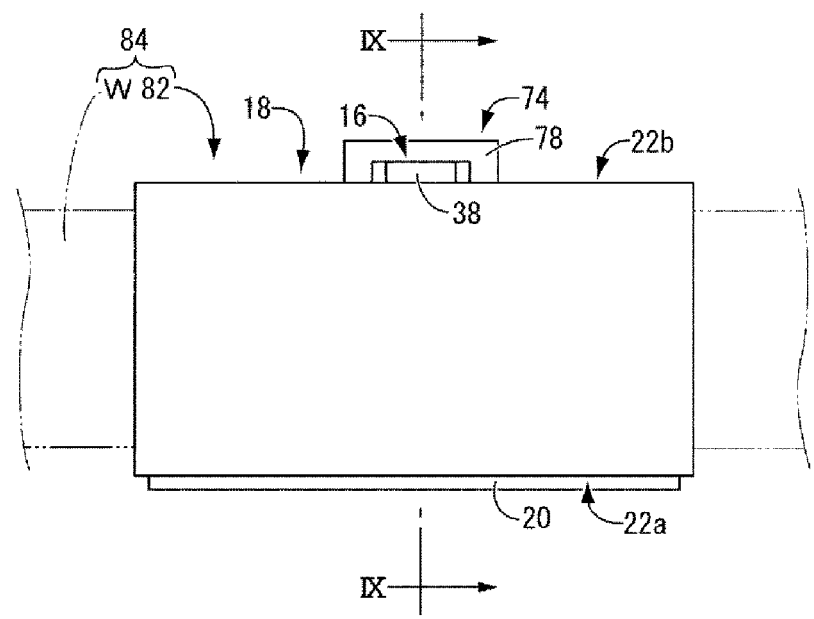
FIG. 8 is a side view for describing a representative example configuration of a protector for a wire harness according to a second embodiment.
Figure 9:
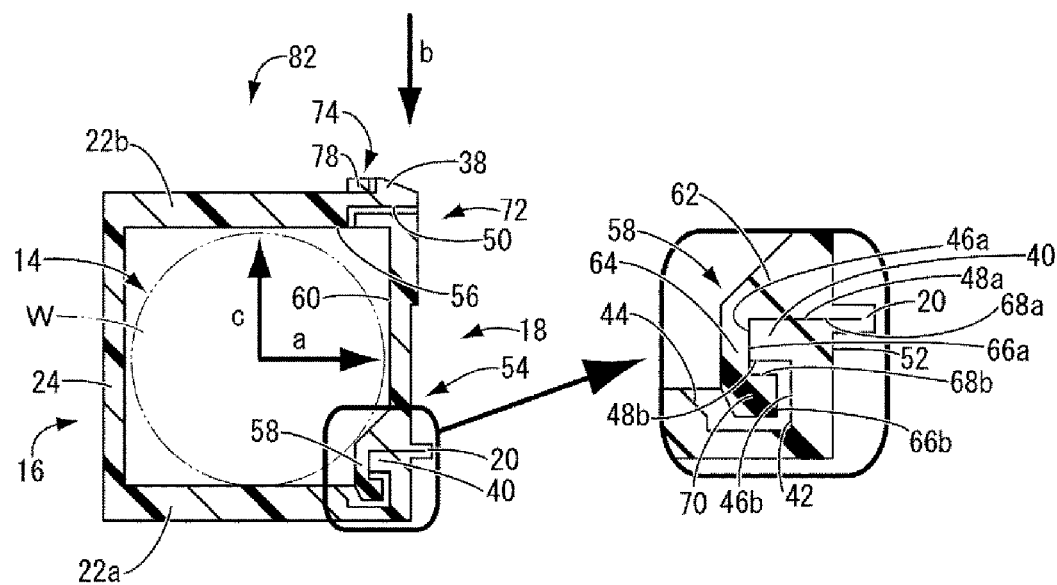
FIG. 9 is a cross-sectional view taken along IX-IX in FIG. 8.

FIGS. 8 and 9 are diagrams illustrating another specific example corresponding to a second embodiment. Hereinafter, the members and portions that are essentially the same as those in the first embodiment are given the same reference sign and description thereof will be omitted.

A protector 82 for a wire harness according to the second embodiment is a harness protector that provides protection by restricting the movement of the wire harness W. The cable guide 10 constituting the protector for a wire harness according to the first embodiment is configured by joining together the plurality of cylindrical link frame bodies 12 in a manner allowing for rotation within a predetermined angle range. However, the protector for a wire harness of the present disclosure also includes embodiments such as the protector 82 for a wire harness according to the second embodiment illustrated in FIGS. 8 and 9 which includes a single body portion 16 and a single cover body 18.

As illustrated in FIGS. 8 and 9, the protector 82 for a wire harness includes the body portion 16 into which the wire harness W is inserted and the cover body 18 that covers the opening portion 56 of the body portion 16. The body portion 16 includes the bottom wall 24 and the pair of side walls 22a, 22b provided extending up from the side edge portions of the bottom wall 24 and is formed extending in trough-like shape in a longitudinal direction (the lateral direction in FIG. 8). Note that, the trough-like shape, for example, includes a groove with a cross-sectional shape, such as a semicircular arc shape, a concave shape, a U shape, or an inverted trapezoidal shape, and an upper surface opening and a combination of such grooves. The cover body 18 that covers the opening portion 56 of the body portion 16 is rotatably joined to the first side wall 22a constituting the body portion 16 via the flexible joining portion 20. As in the first embodiment, the first side wall 22a of the body portion 16 is provided with the sideward projecting portion 40 that constitutes body contact portion. The cover body 18 is provided with the cover body contact portion 58 that transfers to the body portion 16 a load applied to the cover body 18 via the cover body contact portion 58 coming into contact with the sideward projecting portion 40. Note that the body contact portion (the sideward projecting portion 40) and the cover body contact portion 58 may be provided continuously along the entire length of the body portion 16 in the longitudinal direction or may be provided interrupted at one or more sections along the longitudinal direction. In this manner, as with the cable guide 10 according to the first embodiment, the protector 82 for a wire harness according to the second embodiment includes the body contact portion (the sideward projecting portion 40) and the cover body contact portion 58. Accordingly, with the protector 82 for a wire harness according to the second embodiment as well, the loads a, b, c (the arrows a, b, c) illustrated in FIG. 9 caused by movement of the wire harness W or interference with other members can be dispersed to the body portion 16. In this manner, the user-friendliness brought about by the structure in which the body portion 16 and the cover body 18 are integrally joined by the joining portion 20 can be maintained and improvements to the durability of the joining portion 20 and the protector 82 for a wire harness can both be achieved in a compatible manner. Note that an assembly of the protector 82 for a wire harness and the wire harness W housed in the protector 82 for a wire harness may be referred to as a wire harness apparatus 84.

Supplement

A plurality of embodiments, i.e., specific examples of the present disclosure, have been described above. However, the present disclosure is not limited to these specific examples. Modifications, enhancements, and the like within the scope of the claims of the present disclosure are included in the present disclosure. For example, the following embodiments are included in the technical scope of the present disclosure.

(1) In the first and second embodiments described above, the lower surface (the surface opposing the bottom wall 24 in FIG. 7) of the cover body contact portion 58 is chamfered, however the lower surface may be rounded.

(2) In the first and second embodiments described above, the cover body first contact surfaces 66a, 66b, the cover body second contact surfaces 68a, 68b, the body first contact surfaces 46a, 46b, and the body second contact surfaces 48a, 48b are all flat surfaces, but they may be curved surfaces. In this manner, the directionality of the load input can be reduced, and stress concentration can be advantageously alleviated.

LIST OF REFERENCE NUMERALS

10 Cable guide (protector for a wire harness)
12 Link frame body
14 Insertion path
16 Body portion
18 Cover body
20 Joining portion
22a First side wall
22b Second side wall
24 Bottom wall
26a, 26b First plate
28a, 28b Second plate
30 Step portion
32 Joining pin hole
34 Joining pin
35 Guide groove
36 Projecting leading end portion
38 Locking catch
40 Sideward projecting portion (body contact portion)
42 Recess
44 Recess
46a, 46b Body first contact surface
48a, 48b Body second contact surface
50 Cutout portion
52 Upper surface
54 First end portion
56 Opening portion
58 Cover body contact portion
60 Lower surface
62 Downward projecting portion
64 Sideward projecting portion
66a, 66b Cover body first contact surface
68a, 68b Cover body second contact surface
70 Upward projecting portion
72 Second end portion
74 Lock frame portion
76 Housing recess
78 Deflection piece
79 Inner wall
80 Wire harness apparatus
82 Protector for a wire harness
84 Wire harness apparatus

What is claimed is:

1. A protector for a wire harness, comprising:
a body portion into which the wire harness is to be inserted;
a cover body that covers an opening portion of the body portion;
a joining portion with flexibility that is formed thinner than the body portion and the cover body and rotatably joins the cover body to a first side wall of the body portion;
a body contact portion provided on the first side wall of the body portion; and
wherein the body portion includes a bottom wall, the first side wall provided extending up from one of two side edges of the bottom wall, and a second side wall provided extending up from another one of the two side edges of the bottom wall, the bottom wall, the first side wall, and the second side wall defining an insertion path through which the wire harness is to be inserted;

the body contact portion is constituted by a sideward projecting portion that projects from a projecting leading end portion of the first side wall toward the second side wall;

a first end portion of the cover body is joined to an upper surface of the sideward projecting portion by the joining portion; and the upper surface of the sideward projecting portion is positioned in the same plane as an upper surface of the cover body when the cover body is rotated about the joining portion to cover the opening portion.

2. The protector for a wire harness according to claim 1, wherein the cover body contact portion includes a downward projecting portion that projects from a lower surface of the cover body toward the bottom wall of the body portion when the cover body is in a closed state and a sideward projecting portion that projects from a projecting end portion of the downward projecting portion toward the first side wall when the cover body is in a closed state;

by disposing the sideward projecting portion of the cover body beneath the sideward projecting portion of the body portion, the sideward projecting portion of the cover body and the sideward projecting portion of the body portion come into contact with one another in an opposite direction to an opposing direction in which the cover body and the bottom wall of the body portion oppose one another; and the downward projecting portion of the cover body and the sideward projecting portion of the body portion come into contact with one another in an orthogonal direction orthogonal to the opposing direction.

3. The protector for a wire harness according to claim 2, wherein a recess that opens toward the bottom wall is formed on a base end side of the sideward projecting portion of the body portion;

the cover body further includes an upward projecting portion that projects upward from a projecting end portion of the sideward projecting portion;

the upward projecting portion of the cover body is disposed housed in the recess of the body portion; and an outer surface of the upward projecting portion and an inner surface of the recess come into contact with one another at both sides in the orthogonal direction and the opposite direction to the opposing direction.

4. The protector for a wire harness according to claim 1, wherein the cover body contact portion includes a cover body first contact surface that runs parallel with the cover body; and the body contact portion includes a body first contact surface that runs parallel with a bottom surface of the cover body and comes into contact with the cover body first contact surface.

5. The protector for a wire harness according to claim 1, wherein the cover body contact portion includes a cover body second contact surface that runs orthogonal to the cover body; and the body contact portion includes a body second contact surface that runs orthogonal to a bottom surface of the cover body.

6. The protector for a wire harness according to claim 1, further comprising a cable guide including a plurality of link frame bodies with a cylindrical shape disposed in a row and joined to one another in a manner allowing for rotation, wherein the plurality of link frame bodies each include the body portion and the cover body and the plurality of link frame bodies formed in the cylindrical shape each further include the joining portion, the body contact portion, and the cover body contact portion.

7. A wire harness apparatus, comprising:

the protector for the wire harness according to claim 1; and the wire harness housed in the protector for the wire harness.

* * * * *